(12) United States Patent
Huang

(10) Patent No.: US 11,739,878 B2
(45) Date of Patent: Aug. 29, 2023

(54) TELESCOPIC BLADDER WITH NOISE REDUCTION STRUCTURE

(71) Applicant: Hsien-Ta Huang, Taoyuan (TW)

(72) Inventor: Hsien-Ta Huang, Taoyuan (TW)

( * ) Notice: Subject to any disclaimer, the term of this patent is extended or adjusted under 35 U.S.C. 154(b) by 0 days.

(21) Appl. No.: 17/517,764

(22) Filed: Nov. 3, 2021

(65) Prior Publication Data

US 2022/0146033 A1 May 12, 2022

(30) Foreign Application Priority Data

Nov. 12, 2020 (TW) .................................. 109139447

(51) Int. Cl.
*F16L 55/04* (2006.01)
*F16L 55/05* (2006.01)

(52) U.S. Cl.
CPC .................................... *F16L 55/05* (2013.01)

(58) Field of Classification Search
CPC ...................................................... F16L 55/05
USPC ..................................... 138/30, 39, 121, 122
See application file for complete search history.

(56) References Cited

U.S. PATENT DOCUMENTS

| 2,682,893 | A | * | 7/1954 | Ziebold | F16L 55/052 92/45 |
| 3,159,182 | A | * | 12/1964 | Peters | F16J 3/048 138/30 |
| 3,605,817 | A | * | 9/1971 | Bauman | F16L 11/11 138/121 |
| 3,908,704 | A | * | 9/1975 | Clement | F16L 11/02 138/121 |
| 5,058,934 | A | * | 10/1991 | Brannon | F16L 27/111 285/294.1 |
| 5,657,793 | A | * | 8/1997 | Shetler | B29C 59/043 181/247 |
| 5,792,532 | A | * | 8/1998 | Pfleger | F16L 11/15 428/36.9 |
| 2009/0032131 | A1 | * | 2/2009 | Boettner | E03F 1/008 138/121 |

* cited by examiner

*Primary Examiner* — James F Hook
(74) *Attorney, Agent, or Firm* — Chun-Ming Shih; HDLS IPR SERVICES

(57) ABSTRACT

A telescopic bladder with a noise reduction structure is provided. The telescopic bladder has an opening. The telescopic bladder includes a top plate and a plurality of connected annular bodies extending from a periphery of the top plate toward the opening. The annular bodies have a continuous wavy cross-section. An inner surface of at least some of the annular bodies is formed with at least one protrusion. When the telescopic bladder is applied to a pillow, even if the telescopic bladder is inflated or deflated in the middle of the night, there will be no annoying noise, thereby improving the sleep quality effectively.

7 Claims, 6 Drawing Sheets

TELESCOPIC BLADDER WITH NOISE REDUCTION STRUCTURE

FIELD OF THE INVENTION

The present invention relates to a telescopic bladder, and more particularly to a telescopic bladder with a noise reduction structure to reduce the noise caused by extending the telescopic bladder.

BACKGROUND OF THE INVENTION

A bellows tube telescopic structure is widely applied to various devices. As shown in FIG. 1, a conventional telescopic bladder 1 is hollow and closed. The telescopic bladder 1 has an opening 11 for pumping a fluid in and out of the telescopic bladder 1. The telescopic bladder 1 includes a top plate 12 and a plurality of connected annular bodies 13 extending from the periphery of the top plate 12 toward the opening 11. The annular bodies 13 have a continuous wavy cross-section. The annular bodies 13 are telescopic using their structural characteristic. The inventor has invented improved pillows that are telescopic in response to the user's sleeping posture. The pillow is equipped with this kind of bellows tube telescopic bladder to automatically inflate or deflate the pillow, so as to change the height of the pillow in response to the sleeping posture of the user sleeping on her/his back or side. Because pillows are mostly used at night, after the telescopic bladder is deflated and compressed, it will generate annoying high-frequency noises when it is inflated and expanded again. After disassembly, research and experimentation, it is found that the inner and outer surfaces of the bellows-shaped annular bodies 13 of the telescopic bladder 1 are soft and smooth without pores. After being compressed (as shown in the lower right portion of FIG. 1), the opposing surfaces of the annular bodies 13 are in close contact with each other to be in a vacuum state because the air is completely discharged. When the telescopic bladder 1 is inflated and expanded again, it will generate annoying noises sounded "po, po . . . " because it is in a vacuum state before the annular bodies 13 are stretched. The noises caused by the inflation and deflation actions of the telescopic bladder in the pillow will directly affect the sleep quality of the user. Accordingly, the inventor of the present invention has devoted himself based on his many years of practical experiences to solve these problems.

SUMMARY OF THE INVENTION

In view of the shortcomings of the prior art, the primary object of the present invention is to provide a telescopic bladder with a noise reduction structure. When the telescopic bladder is applied to a pillow, even if the telescopic bladder is inflated or deflated in the middle of the night, there will be no annoying noise, thereby improving the sleep quality effectively.

In order to achieve the foregoing object, a telescopic bladder with a noise reduction structure is provided. The telescopic bladder is hollow and closed, and has an opening. The telescopic bladder includes a top plate and a plurality of connected annular bodies extending from a periphery of the top plate toward the opening. The annular bodies have a continuous wavy cross-section. The annular bodies are telescopic using their structural characteristic.

An inner surface of at least some of the annular bodies is formed with at least one protrusion. The protrusion is preferably arranged as close as possible to an inner edge of the annular body.

The protrusion is in the shape of a strip, circle, triangle or polygon.

The protrusions of adjacent upper and lower ones of the annular bodies are arranged staggered relative to each other. Thus, the overall height of the telescopic bladder after being retracted can be reduced, and the whole telescopic bladder is flat and not skew after being compressed.

The at least one protrusion of the annular body includes two protrusions arranged diagonally.

The number of the at least one protrusion of the annular body is X, and the protrusions are arranged by an average angle obtained by dividing X into 360 degrees.

In consideration of the molding process, an outer surface of the annular body is formed with a recess corresponding in position to the protrusion.

The protrusion is not limited to be disposed on the inner surface of the annular body, and it may be disposed on the outer surface of the annular body.

The inner surface of the annular body is a rough surface, not a smooth surface, so that the noise caused by extending the annular bodies can be eliminated.

DETAILED DESCRIPTION OF THE PREFERRED EMBODIMENTS

Embodiments of the present invention will now be described, by way of example only, with reference to the accompanying drawings.

Figure 1:
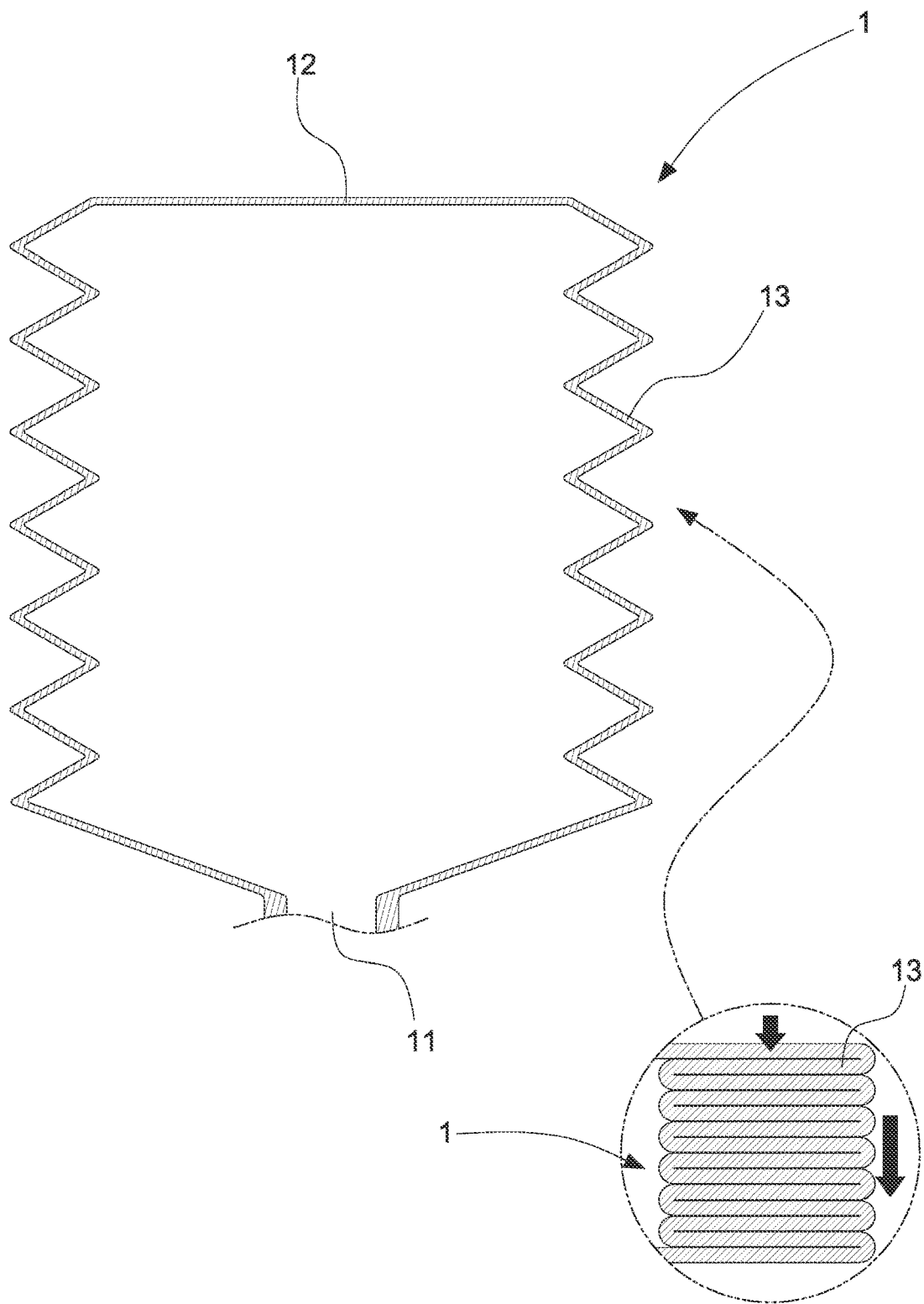
FIG. 1 is a cross-sectional view of a conventional telescopic bladder.
Figure 2:
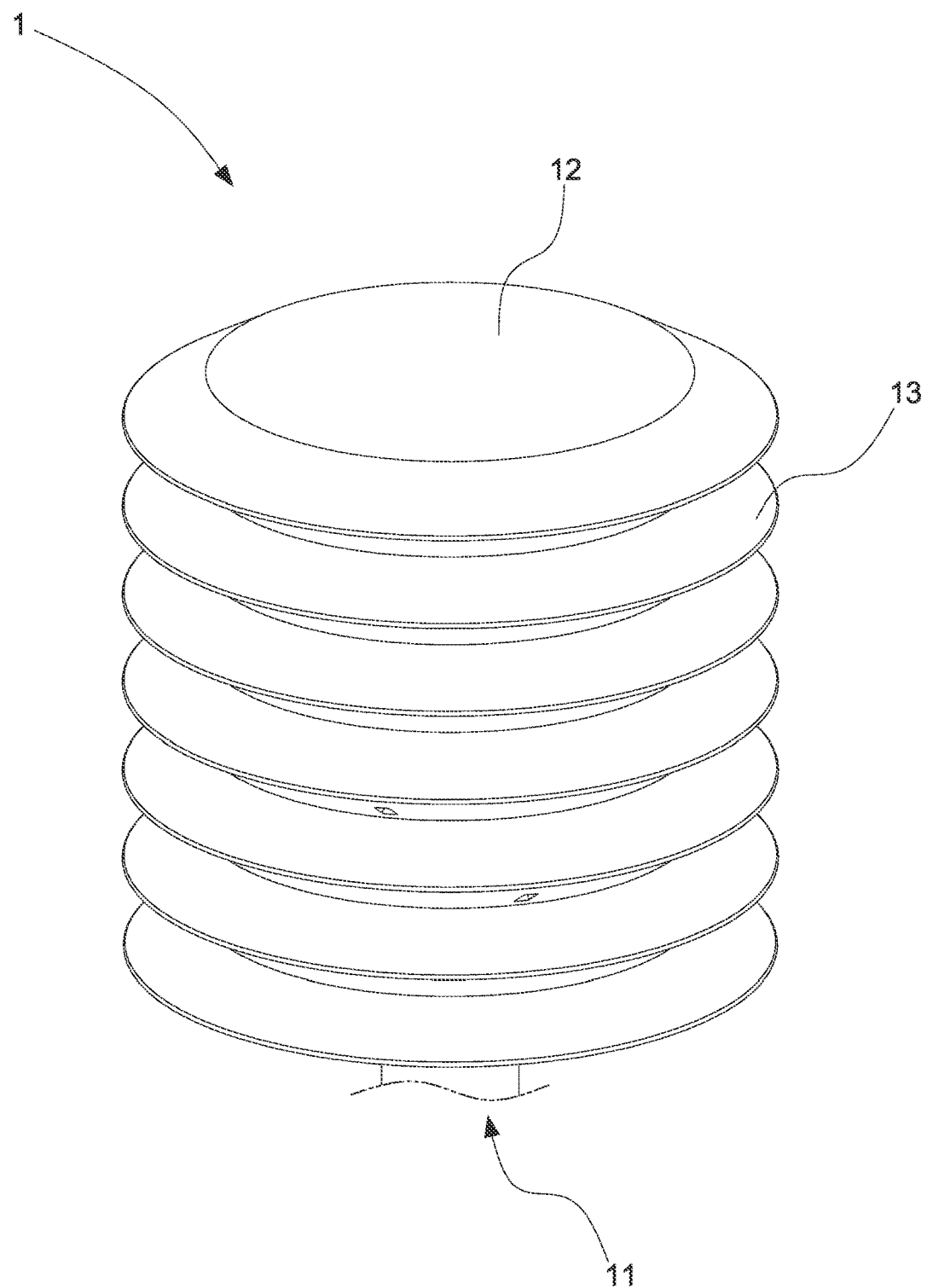
FIG. 2 is a perspective view according to a first embodiment of the present invention.
Figure 3:
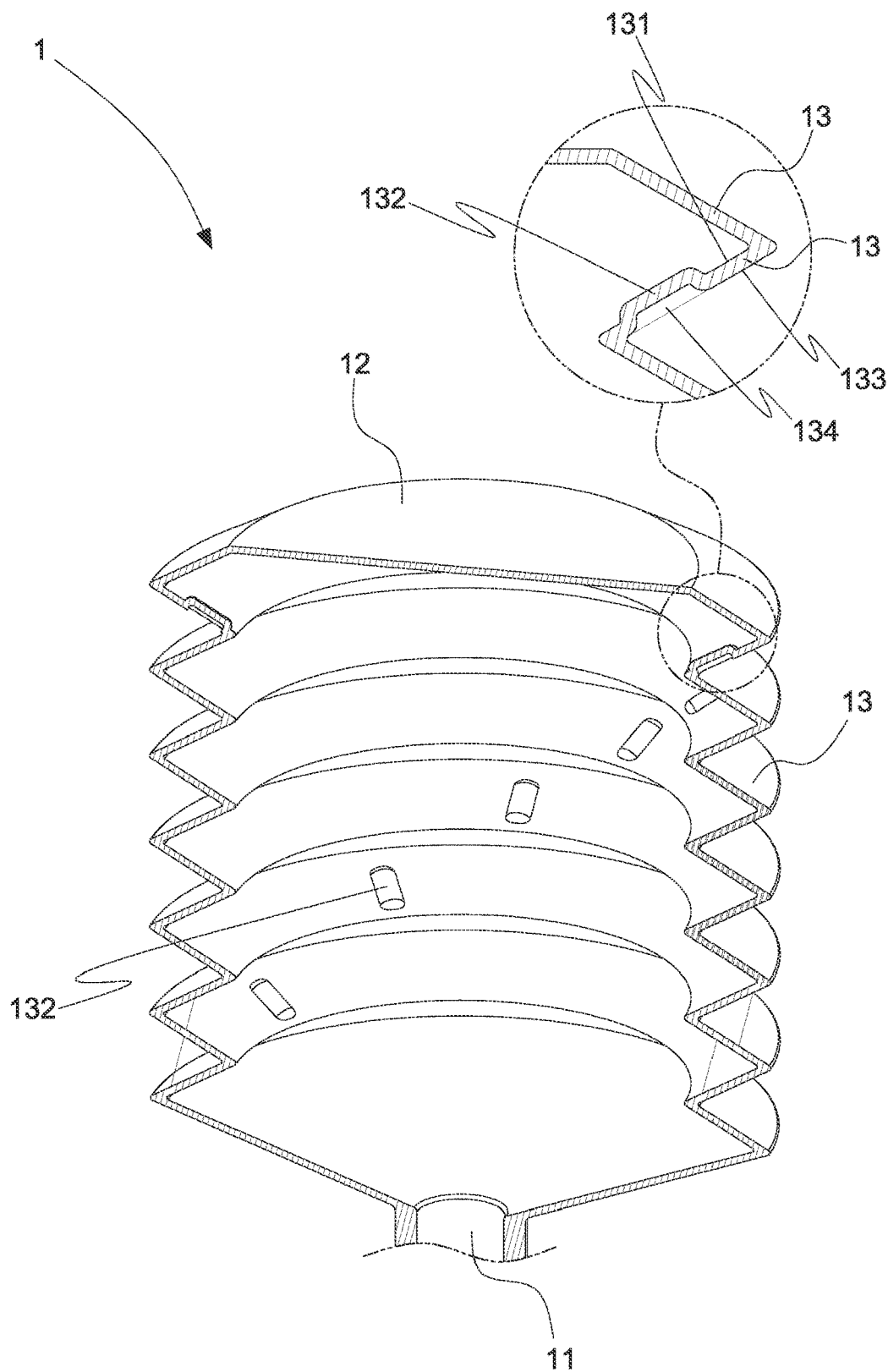
FIG. 3 is a cross-sectional view according to the first embodiment of the present invention.

As shown in FIG. 2 and FIG. 3, the present invention discloses a telescopic bladder 1 with a noise reduction structure. The telescopic bladder 1 is hollow and closed. The telescopic bladder 1 has an opening 11 for pumping a fluid in and out of the telescopic bladder 1. The telescopic bladder 1 includes a top plate 12 and a plurality of connected annular bodies 13 extending from the periphery of the top plate 12 toward the opening 11. The annular bodies 13 have a continuous wavy cross-section. The annular bodies 13 are telescopic using their structural characteristic. An inner surface 131 of some or all of the annular bodies 13 is formed with at least one protrusion 132. The protrusion 132 is preferably arranged as close as possible to the inner edge of the annular body 13. In this embodiment, the protrusion 132 is in the shape of a strip, but it may be in various shapes such as a circle, triangle, and polygon. The protrusions 132 of the adjacent upper and lower annular bodies 13 are arranged staggered relative to each other. In this way, the overall height of the telescopic bladder after being retracted can be reduced, and the whole telescopic bladder is flat and not skew after being compressed. Furthermore, the annular body 13 may be provided with two protrusions 132 arranged diagonally. If the number of protrusions 132 of the annular body 13 is X, the protrusions 132 are arranged by an average angle obtained by dividing X into 360 degrees. In addition, in consideration of the molding process, an outer surface 133 of the annular body 13 is formed with a recess 134 corresponding to the protrusion 132.

Figure 4:
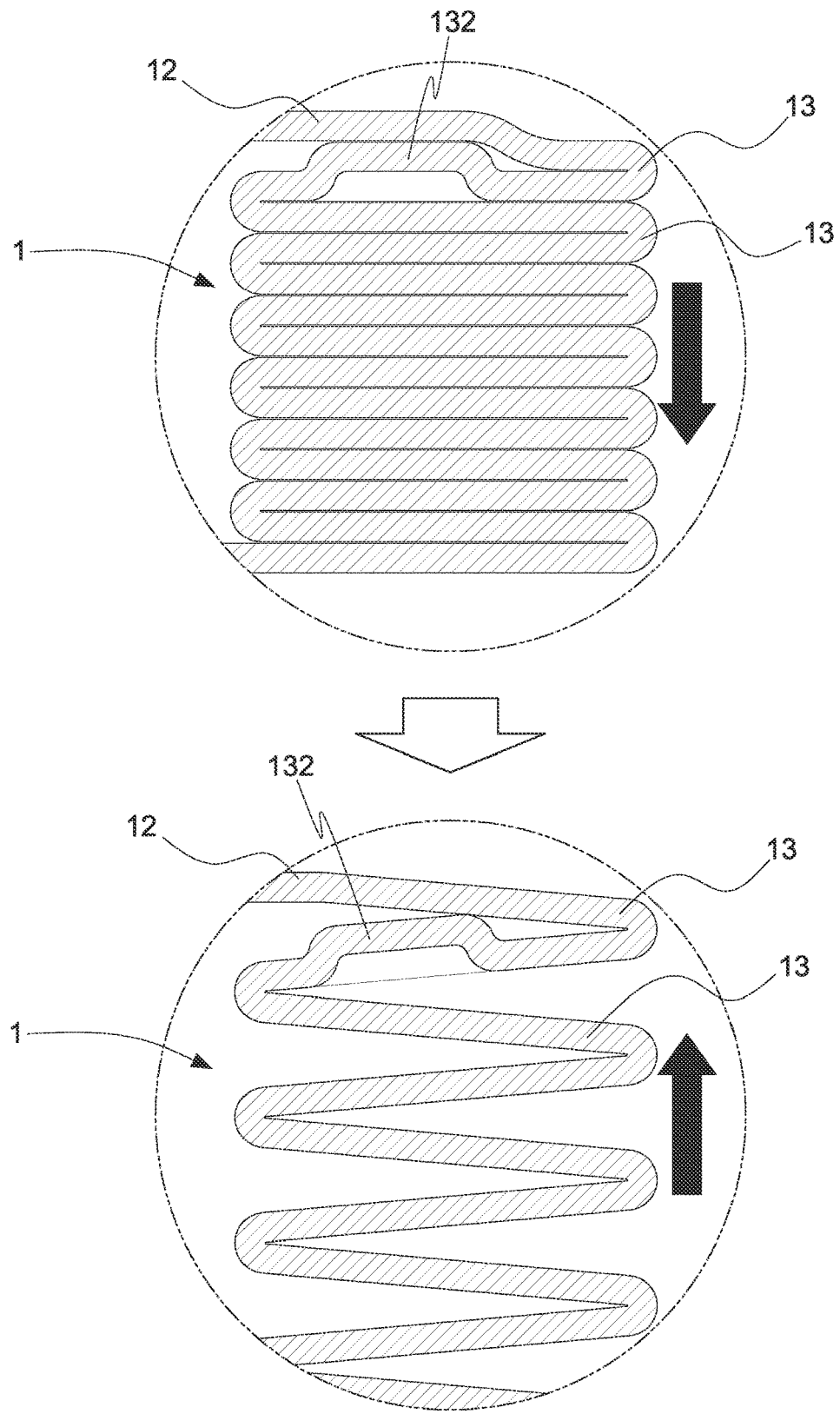
FIG. 4 is a cross-sectional view showing the operation of the first embodiment of the present invention.

Referring to FIG. 3 and FIG. 4, since the inner surface 131 of the annular body 13 of the present invention is provided with the protrusion 132, after the annular bodies 13 are compressed, because of the arrangement of the protrusion 132 as well as the space beside the protrusion 132, the inner surfaces 131 of the adjacent upper and lower annular bodies 13 won't be completely attached to each other to keep a gap and air, so as to avoid a vacuum effect similar to a suction cup. Therefore, when the telescopic bladder 1 is inflated and expanded, the annular bodies 13 are extended smoothly and freely, without noises. When the present invention is applied to a pillow and used at night, the improved effect is remarkable.

Figure 5:
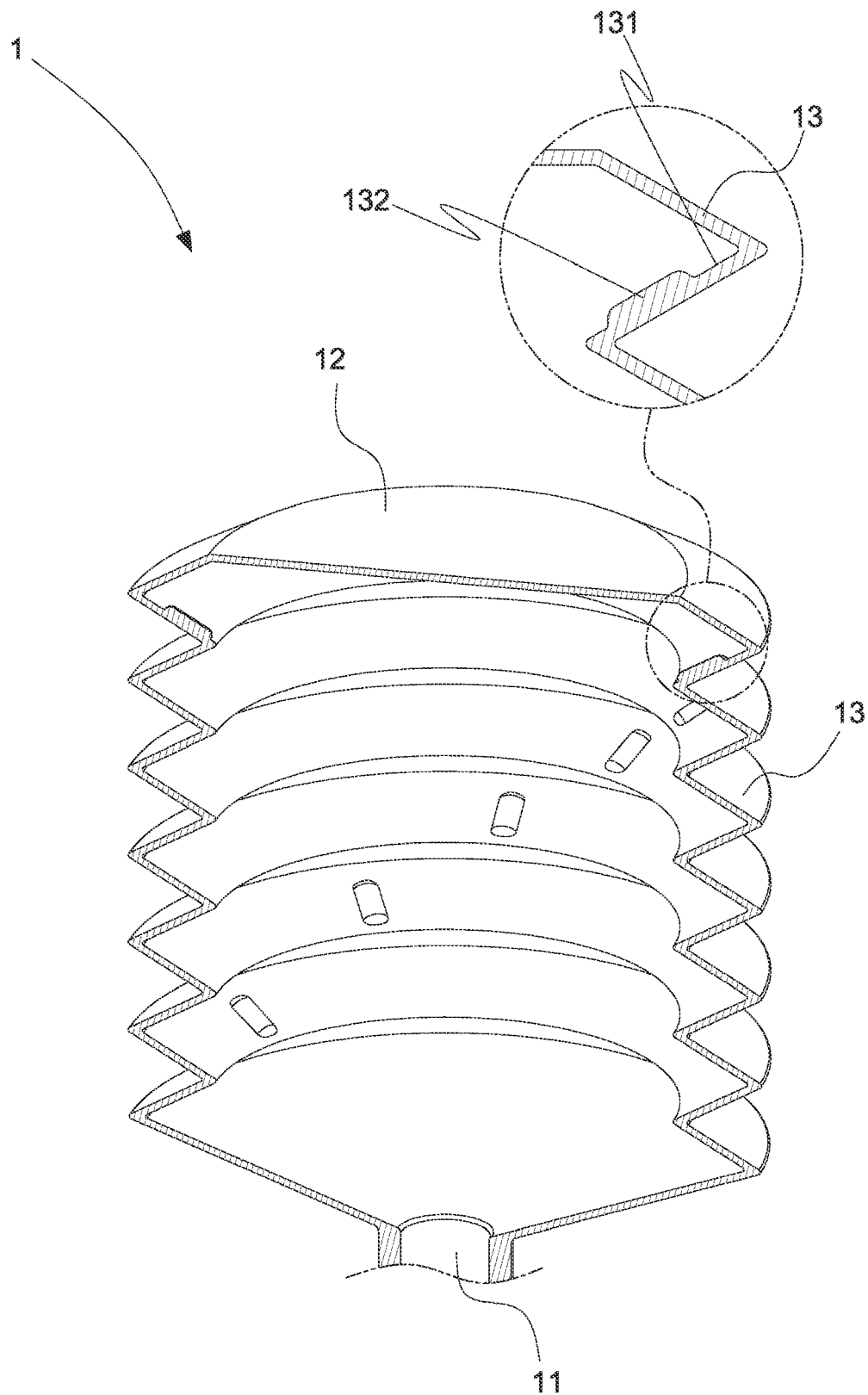
FIG. 5 is a cross-sectional view according to a second embodiment of the present invention.

FIG. 5 illustrates another embodiment of the present invention. Compared with FIG. 3, the outer surface 133 of the annular body 13 is not provided with the recess 134 corresponding to the protrusion 132.

Figure 6:
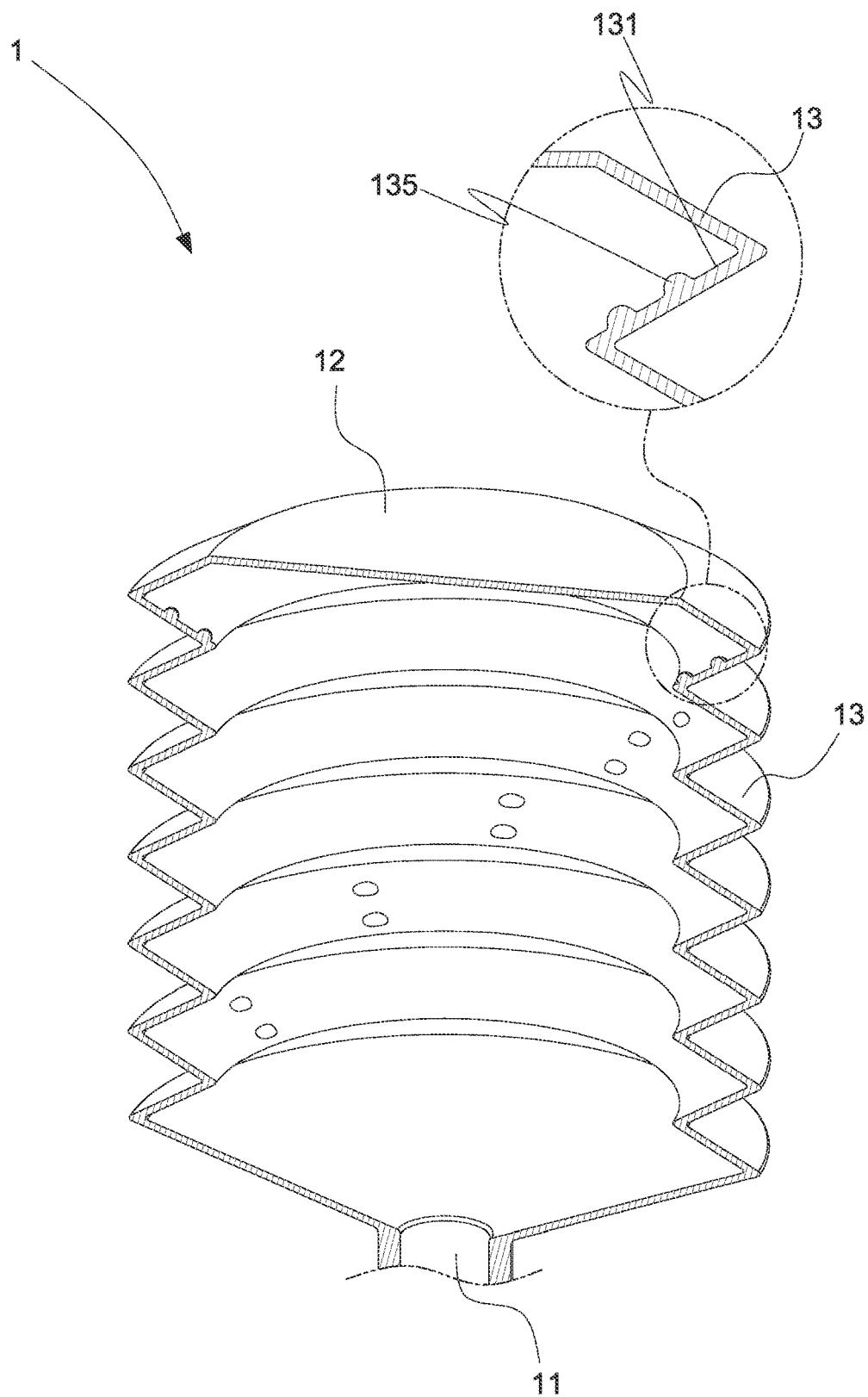
FIG. 6 is a cross-sectional view according to a third embodiment of the present invention.

FIG. 6 illustrates a further embodiment of the present invention. The protrusion 135 of the annular body 13 may be in the form of a plurality of spaced convex points.

What is claimed is:

1. A telescopic bladder with a noise reduction structure, having an opening, the rest of the telescopic bladder being hollow and closed; the telescopic bladder including a top plate and a plurality of connected annular bodies extending from a periphery of the top plate toward the opening, the annular bodies having a continuous wavy cross-section; the annular bodies being telescopic using their structural characteristic; wherein an inner surface of one of some or all of the annular bodies is formed with at least one protrusion so that two inner surfaces of the adjacent upper and lower annular bodies are not completely attached to each other to keep a gap around the protrusion, in order to avoid a vacuum effect similar to a suction cup; thereby, when the telescopic bladder applied to a pillow is inflated and expanded, the annular bodies are extended smoothly and freely, without noises.

2. The telescopic bladder as claimed in claim 1, wherein the protrusion is in the shape of a strip, circle, triangle or polygon.

3. The telescopic bladder as claimed in claim 1, wherein the protrusions of adjacent upper and lower ones of the annular bodies are arranged staggered relative to each other.

4. The telescopic bladder as claimed in claim 1, wherein the at least one protrusion of the annular body includes two protrusions arranged diagonally.

5. The telescopic bladder as claimed in claim 1, wherein the number of the at least one protrusion of the annular body is X, and the protrusions are arranged by an average angle obtained by dividing X into 360 degrees.

6. The telescopic bladder as claimed in claim 1, wherein an outer surface of the annular body is formed with a recess corresponding in position to the protrusion.

7. The telescopic bladder as claimed in claim 1, wherein the protrusion of the annular body is arranged adjacent to an inner edge of the annular body.

* * * * *